US009199205B2

(12) United States Patent
Weber et al.

(10) Patent No.: US 9,199,205 B2
(45) Date of Patent: Dec. 1, 2015

(54) ULTRAFILTRATION MEMBRANES FABRICATED FROM SULFONATED POLYPHENYLENESULFONES

(71) Applicants: BASF SE, Ludwigshafen (DE); National University of Singapore, Singapore (SG)

(72) Inventors: Martin Weber, Maikammer (DE); Christian Maletzko, Altrip (DE); Natalia Widjojo, Singapore (SG); Peishan Zhong, Singapore (SG); Tai-Shung Chung, Ann Arbor, MI (US)

(73) Assignees: BASF SE, Ludwigshafen (DE); National University of Singapore, Singapore (SG)

( * ) Notice: Subject to any disclaimer, the term of this patent is extended or adjusted under 35 U.S.C. 154(b) by 0 days.

(21) Appl. No.: 13/866,529

(22) Filed: Apr. 19, 2013

(65) Prior Publication Data

US 2013/0277318 A1 Oct. 24, 2013

Related U.S. Application Data

(60) Provisional application No. 61/635,974, filed on Apr. 20, 2012.

(51) Int. Cl.

| C08G 75/00 | (2006.01) |
| B01D 71/68 | (2006.01) |
| B01D 67/00 | (2006.01) |
| B01D 71/82 | (2006.01) |
| B01D 61/14 | (2006.01) |

(52) U.S. Cl.
CPC ............ *B01D 71/68* (2013.01); *B01D 67/0002* (2013.01); *B01D 71/82* (2013.01); *B01D 61/145* (2013.01); *B01D 2325/14* (2013.01); *B01D 2325/34* (2013.01)

(58) Field of Classification Search
CPC ................. C08G 2261/516; C08G 2261/1452; C08G 2261/722; C08G 18/0828; H01B 1/122; H01M 8/1025; H01M 8/1027
USPC ........................................ 528/125, 373, 370
See application file for complete search history.

(56) References Cited

U.S. PATENT DOCUMENTS

| 5,985,477 | A | * | 11/1999 | Iwasaki et al. ................. 429/493 |
| 2007/0163951 | A1 | | 7/2007 | McGrath et al. |
| 2008/0275146 | A1 | * | 11/2008 | McGrath et al. ................. 521/27 |

(Continued)

FOREIGN PATENT DOCUMENTS

| CA | 2325020 A1 | 10/1999 |
| EP | 1394879 A1 | 3/2004 |
| GB | 2090843 A | 7/1982 |

OTHER PUBLICATIONS

Smolders et al. (J. Mem. Sci., 73, 1992, 259-275).*

(Continued)

*Primary Examiner* — Shane Fang
(74) *Attorney, Agent, or Firm* — Drinker Biddle & Reath LLP

(57) ABSTRACT

The present invention is directed to ultrafiltration membranes comprising a membrane substrate layer (S) based on a sulfonated polyaryleneethersulfone polymer and to a method for their preparation. Furthermore, the present invention is directed to ultrafiltration processes making use of said membrane.

14 Claims, 1 Drawing Sheet

(56) References Cited

U.S. PATENT DOCUMENTS

2010/0326833 A1    12/2010    Messalem et al.
2012/0043274 A1    2/2012    Chi et al.

OTHER PUBLICATIONS

Arthanareeswaran, G., et al., "Preparation, characertization and performance studies of ultrafiltration membranes with polymeric additive", Journal of Membrance Science, vol. 350, (2010), pp. 130-138.

Echavarria, A., et al., "Ultrafiltration and reverse osmosis for clarification and concentration of fruit juices at pilot plant scale", LWT—Food Science and Technology, vol. 46, (2012), pp. 189-195.

Geise, G., et al., "Water Purification by Membranes: The Role of Polymer Science", Journal of Polymer Science Part B: Polym. Phys., vol. 48, (2010), pp. 1685-1718.

Harrison, W., "Influence of Bisphenol Structure on the Direct Synthesis of Sulfonated Poly(Arylene Ether)S", Polymer Preprints, vol. 41, No. 2, (2000), pp. 1239-1240.

Johnson, R., et al., "Poly(aryl Ethers) by Nucleophilic Aromatic Substitution I. Synthesis and Properties", Journal of Polymer Science, vol. 5, (1967), pp. 2375-2398.

Kumari, A., et al., "Preparation and Characterization of Polyvinylpyrollidone Incorporated Cellulose Acetate Membranes for Ultrafiltration of Metal Ion", Journal of Applied Polymer Science, vol. 124, (2012), pp. E300-E308.

Lu, J., et al., "Cleaning Membranes with Focused Ultrasound Beams for Drinking Water Treatment", Ultrasonics Sympsosium IUS, (2009), pp. 1195-1198.

Ma, Y., "Effect of PEG additive on the morphology and performance of polysulfone ultrafiltration memranes", Desalination, vol. 272, (2011), pp. 51-58.

Pezeshk, N., et al., "Novel Modified PVDF ultrafiltration flat-sheet membranes", Journal of Membrane Science, vol. 389, (2012), pp. 280-286.

Sarbolouki, M., et al., "Properties of Asymmetric Polymaide Ultrafiltration Membranes. I. Pore Size and Morphology Characertization", Journal of Applied Science, vol. 29, (1984), pp. 743-753.

Singh, S., "Membrane characterization by solute transport and atomic force microscopy", Journal of Membrane Science, vol. 142, (1998), pp. 111-127.

Smolders, C., et al., "Microstructure in phase-inversion membranes. Part 1. Formation of macrovoids", Journal of Membrane Sciences, vol. 73, (1992), pp. 259-275.

Ulbricht, M., et al., "Surface modification of ultrafiltration memranes by low temperature.plasma II. Graft polymerization onto polyacrylonitrile and polysulfone", Journal of Membrane Science, vol. 111, (1996), pp. 193-215.

Wang, K., et al., "The effects of flow angle and shear rate within the spinneret on the separation performance of poly(ethersulfone) (PES) ultrafiltration hollow fiber membranes", Journal of Membrane Science, vol. 240, (2004), pp. 67-79.

Ueda, M., et al., "Synthesis and Characterization of Aromatic Poly(ether Sulfone) s Containing Pendant Sodium Sulfonate Groups", Journal of Polymer Science: A Polymer Chemistry, vol. 31, (1993), pp. 853-858.

Vogel, H., "Polyarylsulfones, Synthesis and Properties", Journal of Polymer Science, vol. 8, (1970), pp. 2035-2047.

Widjojo, N., et al., "The role of sulphonated polymer and macrovoid-free structure in the support layer for thin-film composite (TFC) forward osmosis (FO) membranes", Journal of Membrane Science, vol. 383, (2011), pp. 214-223.

Yang, Q., et al., "Tailoring pore size and pore size distribution of kidney dialysis hollow fiber membranes via dual-bath coagulation approach", Journal of Membrane Science, vol. 290, (2007), pp. 153-163.

Zarate-Rodriguez, E., et al., "Effect of membrane pore size on quality of ultrafiltered apple juice", International Journal of Food Science and Technology, vol. 36, (2001), pp. 663-667.

International Search Report for PCT/EP2013/058173, mailing date Jun. 28, 2013.

\* cited by examiner

ULTRAFILTRATION MEMBRANES FABRICATED FROM SULFONATED POLYPHENYLENESULFONES

CROSS REFERENCE TO RELATED APPLICATIONS

This application claims benefit (under 35 USC 119(e)) of U.S. Provisional Application 61/635,974, filed Apr. 20, 2012, which is incorporated by reference.

The present invention is directed to ultrafiltration membranes comprising a membrane substrate layer (S) based on a sulfonated polyaryleneethersulfone polymer, in particular sulfonated polyphenylenesulfone (sPPSU) polymer and to a method for their preparation. Furthermore, the present invention is directed to ultrafiltration processes making use of said membrane.

BACKGROUND OF THE INVENTION

Ultrafiltration (UF) is a membrane process which lies between microfiltration (MF) and nanofiltration (NF). The pore sizes of such membranes are typically within the range of about 2 to 100 nm [1]. Upon applying a driving force of 1-3 bar, this membrane process results in the retention of macromolecules and colloids. While these larger molecules are retained by the membrane, smaller molecules along with the solvent permeate freely. As such, the mechanism of UF depends mainly on size exclusion. This process has been widely applied in industries, such as juice and beverage [2, 3] dialysis [4], and water purification The ideal UF membranes should have the characteristics of: (1) hydrophilicity and high water flux; (2) highly porous with sponge-like (no macrovoid) and interconnected pore structures; (3) sufficient mechanical strength with good long term membrane stability.

Most UF membranes are prepared via the phase inversion process to form asymmetric membranes from materials such as polysulfone (PSU) [5], poly(vinylidene) fluoride (PVDF) [6], cellulose acetate (CA) [7] and polyimide (PI) [8]. Among these, polyarylsulfones are known for their chemical and mechanical resistance, thermal stability as well as ability to withstand wide ranges of temperature and corrosive environment [9]. However, in account of the hydrophobic properties of some abovementioned polymers, i.e. PSU and PVDF, UF membranes made from these polymers are subject to poor wettability by an aqueous media, macrovoids formation as well as fouling tendency. As a result, there is the need to include additives which commonly act as hydrophilizing and pore forming agents, i.e. polyethylene glycol (PEG) [10,11], polyvinylpyrollidone (PVP) to such polymer materials for UF applications.

There is a need of advanced UF separation techniques making use of membranes with an excellent chemical resistance and thermal stability In the previous works, sulfonated PPSUs with a functionality of 0.8 to 2.5 meq/g [12] and polymer blends of CA and sulfonated PPSU [13] have been applied for electro dialysis. However, UF membranes consisting of directly sulfonated material prepared without blending with other polymer materials with lower functionality would be highly desirable.

SUMMARY OF THE INVENTION

The above problem is, in particular, solved by providing ultrafiltration (UF) integrally asymmetric membranes with fully porous and sponge-like morphology via the phase inversion process using sulfonated polyphenylenesulfone (sPPSU) synthesized via direct sulphonation route. With the sulphonated monomer content, the newly developed membranes exhibit high water permeability. The hydrophilic nature of the UF membranes with negative charge is likely to reduce the fouling tendency. The methods described in this invention can be extended to produce integrally skinned asymmetric hollow fiber membranes from the aforementioned polymer materials for various applications in the membrane industry. In particular, these newly developed UF membranes have the potential to be applied in processes like hemodialysis, protein separation/fractionation, virus removal, recovery vaccines and antibiotics from fermentation broths, wastewater treatment, milk/dairy product concentration, clarification of fruit juice, etc. The negative charge in these UF asymmetric membranes also can enhance the separation performance for specific protein pairs/mixtures. Such membranes can also be applied as membrane substrates with some modifications for other membrane applications such as nanofiltration and forward osmosis. In term of membrane configuration, the methods described in this invention can be extended to produce integrally skinned UF asymmetric hollow fiber membranes.

More particularly, two new materials, directly sulfonated polyphenylenesulfone (sPPSU) with 2.5 mol % and 5.0 mol % of (5,5'-Di-sulfonate-4,4'-dichlorodiphenyl sulfone) sDCDPS monomer were employed to investigate the effect of hydrophilicity properties on UF performances. Non-sulfonated PPSU was used as a benchmark to compare the performances.

DETAILED DESCRIPTION OF THE INVENTION

Figure 1:
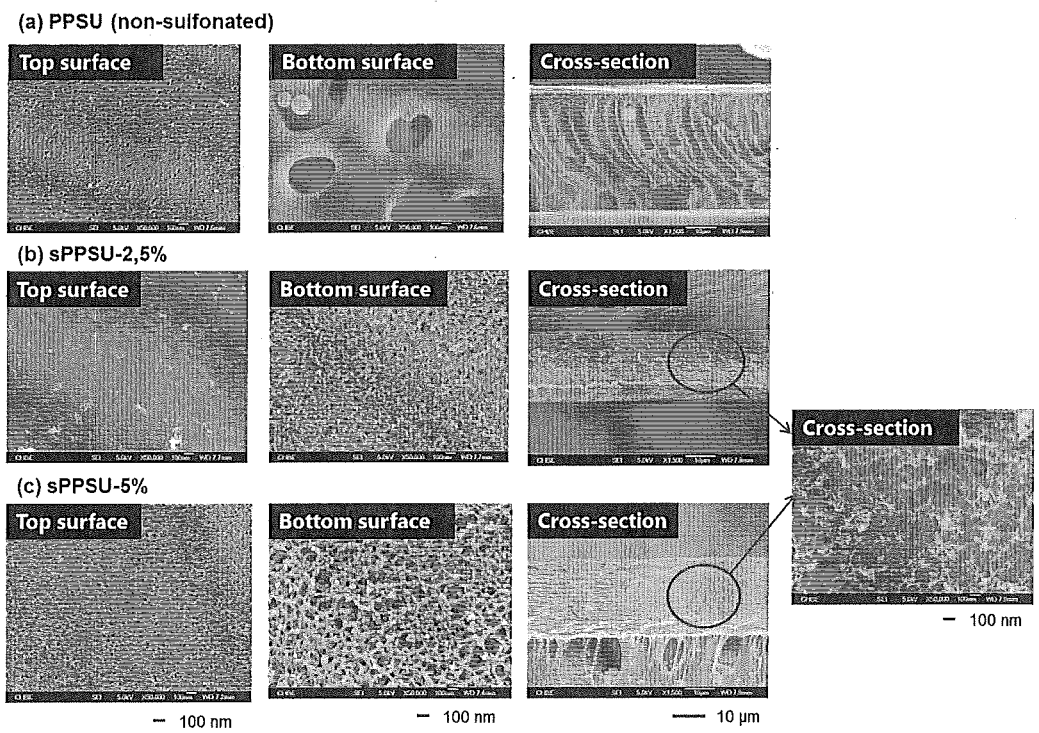
FIG. 1 shows the morphology of as-cast membranes: (a) PPSU; (b) sPPSU-2.5%; (c) sPPSU-5%
Figure 2:
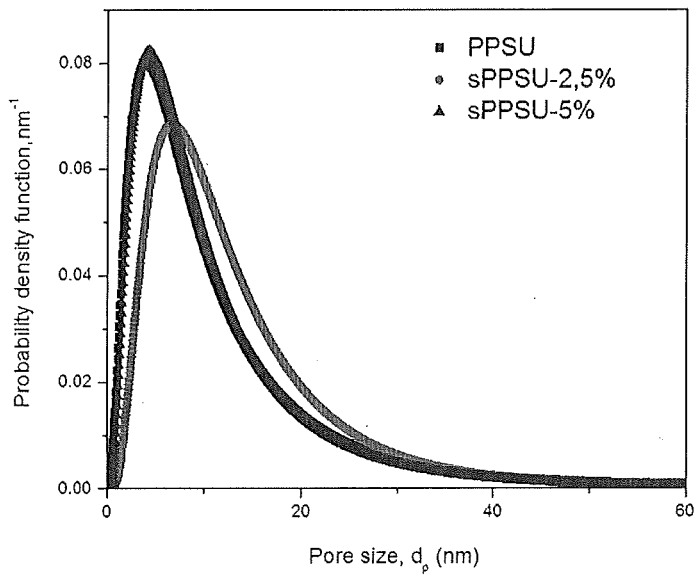
FIG. 2 shows the probability density curve of UF membranes with different sulfonation contents: (a) PPSU; (b) sPPSU-2.5%; (c) sPPSU-5%

A. General Definitions:

"Membranes for water treatment" are generally semi-permeable membranes which allow for separation of dissolved and suspended particles of water, wherein the separation process itself can be either pressure-driven or electrically driven.

Examples of membrane applications are pressure-driven membrane technologies such as microfiltration (MF; pore size about 0.08 to 2 µm, for separation of very small, suspended particles, colloids, bacteria), ultrafiltration (UF; pore size about 0.005 to 0.2 µm; for separation of organic particles >1000 MW, viruses, bacteria, colloids), nanofiltration (NF, pore size 0.001 to 0.01 µm, for separation of organic particles >300 MW Trihalomethan (THM) precursors, viruses, bacteria, colloids, dissolved solids) or reverse osmosis (RO, pore size 0.0001 to 0.001 µm, for separation of ions, organic substances >100 MW).

Molecular weights of polymers are, unless otherwise stated as Mw values, in particular determined via GPC in DMAc (dimethylacetamide). In particular, the GPC measurements were performed with dimethylacetamide (DMAc) containing 0.5 wt-% lithium bromide. Polyester copolymers were used as column material. The calibration of the columns was performed with narrowly distributed PMMA standards. As flow rate 1 ml/min was selected, the concentration of the injected polymer solution was 4 mg/ml.

A "sulfonated" molecule carries at least one sulfonate (or also designated sulfo) residue of the type —SO$_3$H, or the corresponding metal salt form thereof of the type —SO$_3^-$M$^+$, like an alkali meta salt form with M=Na, K or Li "Partially sulfonated" in the context of the present invention refers to a polymer, wherein merely a certain proportion of the monomeric constituents is sulfonated and contains at least one sulfo group residue. In particular about 0.5 to 4.5 mol-% or about 1 to 3.5 mol-% of the monomeric constituents or repeating units of the polymer carry at least one sulfo group. The sulfonated monomeric unit may carry one or more, as for example 2, 3, 4, in particular 2 sulfo groups. If the sulfo content is below 0.5 mol.-% then no improvement of the hydrophilicity can be seen, if the sulfo content is above 5 mol.-% then a membrane with macrovoids and low mechanical stability is obtained.

"Arylene" represents bivalent, mono- or polynucleated, in particular mono-, di- or tri-nucleated aromatic ring groups which optionally may be mono- or poly-substituted, as for example mono-, di- or tri-substituted, as for example by same or different, in particular same lower alkyl, as for example C$_1$-C$_8$ or C$_1$-C$_4$ alkyl groups, and contain 6 to 20, as for example 6 to 12 ring carbon atoms. Two or more ring groups may be condensed or, more preferably non-condensed rings, or two neighbored rings may be linked via a group R selected from a C—C single bond or an ether (—O—) or an alkylene bridge, or halogenated alkylene bridge or sulfono group (—SO$_2$—). Arylene groups may, for example, be selected from mono-, di- and tri-nucleated aromatic ring groups, wherein, in the case of di- and tri-nucleated groups the aromatic rings are optionally condensed; if said two or three aromatic rings are not condensed, then they are linked pairwise via a C—C— single bond, —O—, or an alkylene or halogenated alkylene bridge. As examples may be mentioned: phenylenes, like hydroquinone; bisphenylenes; naphthylenes; phenanthrylenes as depicted below:

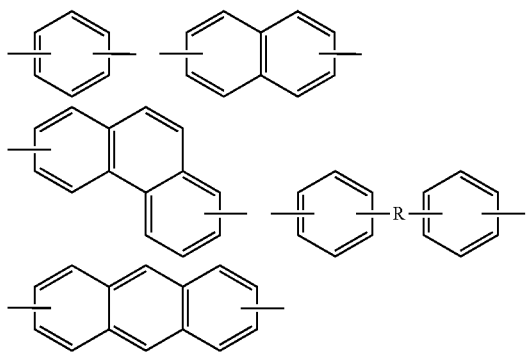

wherein R represents a linking group as defined above like —O—, alkylene, or fluorinated or chlorinated alkylene or a chemical bond and which may be further substituted as defined above.

"Alkylene" represents a linear or branched divalent hydrocarbon group having 1 to 10 or 1 to 4 carbon atoms, as for example C$_1$-C$_4$-alkylene groups, like —CH$_2$—, —(CH$_2$)$_2$—, —(CH$_2$)$_3$—, —(CH$_2$)$_4$—, —(CH$_2$)$_2$—CH(CH$_3$)—, —CH$_2$—CH(CH$_3$)—CH$_2$—, (CH$_2$)$_4$—.

"Lower alkyl" represents an "alkyl" residue which is linear or branched having from 1 to 8 carbon atoms. Examples thereof are: C$_1$-C$_4$-alkyl radicals selected from methyl, ethyl, n-propyl, isopropyl, n-butyl, 2-butyl, isobutyl or tert-butyl, or C$_1$-C$_6$-alkyl radicals selected from C$_1$-C$_4$-alkyl radicals as defined above and additionally pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl.

An "Asymmetric membrane" (or anisotropic membrane) has a thin porous or non-porous selective barrier, supported by a much thicker porous substructure (see also H. Susanto, M. Ulbricht, Membrane Operations, Innovative Separations and Transformations, ed. E. Driolo, L. Giorno, Wiley-VCH-Verlag GmbH, Weinheim, 2009, p. 21)

B. Particular Embodiments

The present invention provides the following particular embodiments:

1. A sponge-like, asymmetric membrane, in particular applicable as UF membrane, comprising at least one asymmetric membrane substrate layer (S) comprising at least one partially sulfonated polyphenylenesulfone polymer (P1).

2. The membrane of embodiment 1 wherein said partially sulfonated polyethersulfone polymer (P1) is a polyarylenethersulfone polymer and is composed of monomeric units of the general formulae

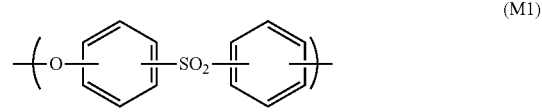

(M1)

(M2)

wherein

Ar represents a divalent aromatic residue, at least one monomeric unit selected from M1 and M2 is sulphonated and wherein the aromatic rings of M1 and/or M2 may further carry one or more same or different substituents (different from sulfo residues of the type —SO$_3$H, or the corresponding metal salt form thereof of the type —SO$_3^-$M$^+$), in particular those suitable for improving the feature profile (like mechanical strength, or permeability) of said substrate layer. Suitable substituents may be lower alkyl substituents, like methyl or ethyl.

3. The membrane of one of the preceding embodiments, wherein in said partially sulfonated polyarylenesulfone polymer (in particular polyphenylenesulfone polymer) (P1) about 0.5 to 5 or 1 to 3.5 mol-% of the monomeric constituents or repeating units of the polymer carry at least one sulfo group.

4. The membrane of one of the preceding embodiments, wherein said partially sulfonated polyarylenesulfone polymer (in particular polyphenylenesulfone polymer) (P1) is obtainable by polymerizing non-sulfonated monomers of the general formulae M1a and M2a

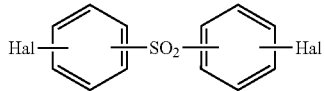

HO—Ar—OH (M2a)

wherein Ar is as defined above, and
Hal is F, Cl, Br or J
as for example the M1a monomer:

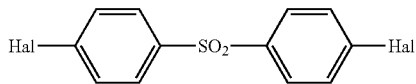

and
as for example the M2a Monomer:

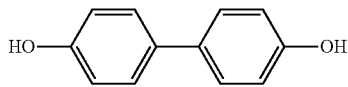

and wherein the aromatic rings of M1a and/or M2a may further carry one or more substituents as described above for M1 and M2;
and at least one sulphonated monomer of the general formulae M1b and M2b

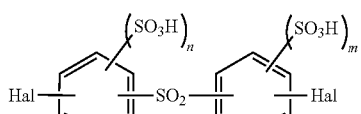

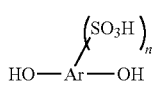

wherein Ar and Hal are as defined above, and n and m independently are 0, 1 or 2, provided that n and m are not simultaneously 0;
as for example the M1b monomer:

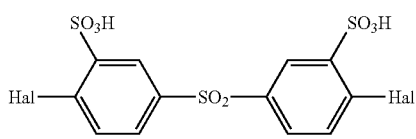

and
as for example the M2b Monomer:

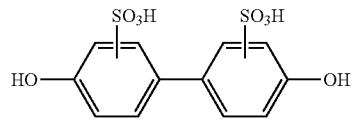

like

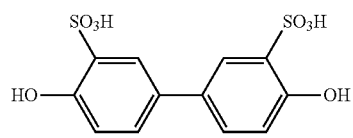 [SMILES: O=S(=O)(O)c1cc(-c2ccc(O)c(S(=O)(=O)O)c2)ccc1O]

and wherein the aromatic rings of M1b and/or M2b may further carry one or more substituents as described above for M1 and M2, and in particular wherein the molar proportion of sulfonated monomers M1b and/or M2b is in the range of 0.5 to 5 mol-% based on the total mole number of M1a, M1b, M2a and M2b. and wherein the molar ratio of (M1a+M1b):(M2a+M2b) is about 0.95 to 1.05, in particular 0.97 to 1.03.

5. The membrane of one of the preceding embodiments, wherein said partially sulfonated polyarylenesulfone polymer (in particular polyphenylenesulfone polymer) (P1) is a block copolymer or statistical copolymer.

6. The membrane of one of the preceding embodiments, wherein said partially sulfonated polyarylenesulfone polymer (in particular polyphenylenesulfone polymer) (P1) comprises
a non-sulfonated repeating unit of formula (1)

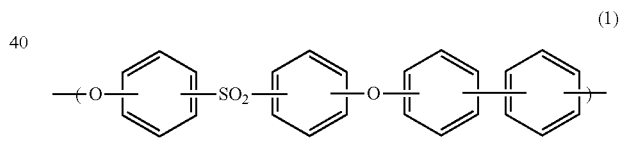

and a sulfonated repeating unit of formula (2)

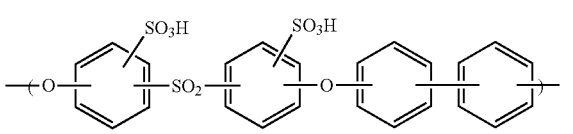

7. The membrane of embodiment 3 wherein said partially sulfonated polyarylenesulfone polymer (in particular polyphenylenesulfone polymer) (P1) comprises
a non-sulfonated repeating unit of formula (1a)

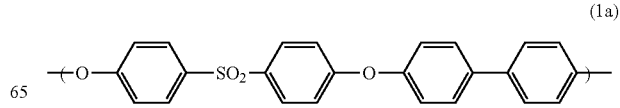

and sulfonated repeating unit of formula (2a)

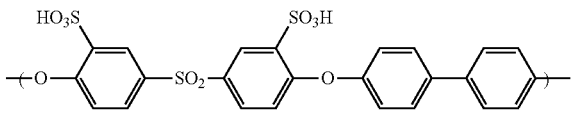
(2a)

8. The membrane of embodiment 6 or 7, wherein said sulfonated repeating unit 2a is contained in a molar ratio of 0.1 to 20, 0.2 to 10, in particular 0.5 to 5 or 1 to 3.5 mol % based on the total mole number of repeating units (1) and (2), or (1a) and (2a), respectively.
9. The membrane of one of the preceding embodiments, wherein said polymer P1 has a Mw in the range of 50,000 to 150,000, in particular 70,000 to 100,000 g/mol, as determined by GPC in DMAc. If the Mw is above 150,000 then the solution viscosity of the polymer it too high. If the Mw is below 50,000, then the obtained membrane show limited mechanical strength.
10. The membrane of anyone of the preceding embodiments, wherein the at least one substrate layer (S) represents a fully, i.e. over essentially the entire cross-ssection, sponge-like and macrovoid-free structure.
11. The membrane of anyone of the preceding embodiments, wherein the substrate layer (S) has a layer thicknesses in the range of 30 to 400, 50 to 250 or 80 to 150 μm. If the layer thickness is above 400 μm then the permeability of the membrane is low, if the layer thickness is below 30 μm, then defects may reduce the selectivity.
12. The membrane of anyone of the preceding embodiments, wherein the sulphonated polymer (P1) is prepared from a monomer mixture comprising already sulfonated monomers of the type M1b
13. A method of preparing a membrane of any one of the preceding claims, which method comprises preparing at least one substrate layer (S) by applying a polymer solution comprising at least one partially sulphonated polyarylenesulfone polymer (in particular polyphenylenesulfone polymer) (P1) as defined in anyone of the embodiments 1 to 7.
14. The method of embodiment 13, wherein the polymer content of said solution is in the range of 10 to 40, 12 to 30 or 16 to 24 wt.-%. If the polymer content is above said range, then the solution viscosity of the dope solution is too high for spinning processes and if it is below said range, then the membrane formation occurs too slow for fibre spinning.
15. The method of embodiment 14, wherein the polymer solution contains at least one solvent selected from N-methylpyrrolidone (NMP), N-dimethylacetamide (DMAc), dimethylsulfoxide (DMSO), dimethylformamide (DMF), triethylphosphate, tetrahydrofuran (THF), 1,4-dioxane, methyl ethyl ketone (MEK), or a combination thereof; and, additionally may contain at least one further additive selected from ethylene glycol, diethylene glycol, polyethylene glycol, glycerol, methanol, ethanol, isopropanol, polyvinylpyrrolidone, or a combination thereof, wherein said additive is contained in said polymer solution in a range of 0 to 50, 1 to 40 or 1 to 25 or 5 to 15 wt.-% per total weight of the polymer solution.
16. The method of anyone of the embodiments 13 to 14, wherein the at least one substrate layer (S) is prepared by applying a phase inversion method using water as a coagulant bath.
17. The method of embodiment 16, wherein water optionally in admixture with at least one lower alcohol, in particular methanol, ethanol, isopropanol, and optionally in admixture with at least one solvent as defined in embodiment 21 is applied as coagulant.
18. An ultrafiltration membrane comprising at least one membrane of anyone of the claims 1 to 11 or prepared according to anyone of the embodiments 13 to 17.
19. The ultrafiltration membrane of embodiment 18 in the form of a flat sheet, hollow fiber or tubule.
20. An ultrafiltration method making use of a membrane of embodiment 18 or 19.
21. The method of embodiment 20 applied for hemodialysis, protein separation/fractionation, virus removal, recovery of vaccines and antibiotics from fermentation broths, wastewater treatment, milk/dairy product concentration, clarification of fruit juice, etc.,
22. The use of a membrane of anyone of the embodiments 1 to 12 or prepared according to anyone of the embodiments 13 to 7 as substrate for fabricating membranes adapted to other applications such as FO or NF.

C. Further Embodiment of the Invention

The manufacture of membranes such as UF membranes and their use in filtration modules of different configuration is known in the art. See for example [19] MC Porter et al. in Handbook of Industrial Membrane Technology (William Andrew Publishing/Noyes, 1990).

1. Preparation of Hydrophilic Membrane Substrate Layer (S)
1.1 Preparation of Polymer P1

Unless otherwise stated, preparation of polymers is generally performed by applying standard methods of polymer technology. In general, the reagents and monomeric constituents as used herein are either commercially available or well known from the prior art or easily accessible to a skilled reader via disclosure of the prior art.

According to a first particular embodiment the partially sulfonated polyarylene sulfone polymer (in particular polyphenylenesulfone polymer) P1 is produced by reacting a mixture of monomers comprising monomers of the type M1a and M2a and at least one sulfonated variant of the Type M1b and M2b.

In general, the sulfonated polyarylene sulfone polymer (in particular polyphenylenesulfone polymer) P1 can be synthesized, for example by reacting a dialkali metal salt of an aromatic diol and an aromatic dihalide as taught, for example by [20] R. N. Johnson et al., J. Polym. Sci. A-1, Vol. 5, 2375 (1967).

Examples of suitable aromatic dihalides (M1a) include: bis(4-chlorophenyl)sulfone, bis(4-fluorophenyl) sulfone, bis (4-bromophenyl) sulfone, bis(4-iodophenyl) sulfone, bis(2-chlorophenyl) sulfone, bis(2-fluorophenyl) sulfone, bis(2-methyl-4-chlorophenyl) sulfone, bis(2-methyl-4-fluorophenyl) sulfone, bis(3,5-dimethyl-4-chlorophenyl) sulfone, bis(3,5-dimethyl-4-fluorophenyl) sulfone and corresponding lower alkyl substituted analogs thereof. They may be used either individually or as a combination of two or more monomeric constituents thereof. Particular examples of dihalides are bis(4-chlorophenyl) sulfone (also designated (4,4'-dichlorophenyl) sulfone; DCDPS) and bis(4-fluorophenyl) sulfone.

Examples of suitable dihydric aromatic alcohols (M2a) which are to react with the aromatic dihalide are: hydroquinone, resorcinol, 1,5-dihydroxynaphthalene, 1,6-dihydroxynaphthalene, 1,7-dihydroxynaphthalene, 2,7-dihydroxynaphthalene, 4,4'-bisphenol, 2,2'-bisphenol, bis(4-hydroxyphenyl) ether, bis(2-hydroxyphenyl) ether, 2,2-bis(4-hydroxyphenyl)propane, 2,2-bis(3-methyl-4-hydroxyphenyl)propane, 2,2-bis(3,5-dimethyl-4-hydroyphenyl) propane, bis(4-hydroxyphenyl)methane, and 2,2-bis(3,5-dimethyl-4-hydroxypenyl)hexafluoropropane. Preferred of them are hydroquinone, resorcinol, 1,5-dihydroxynaphthalene, 1,6-dihydroxynaphthalene, 1,7-dihydroxynaphthalene, 2,7-dihydroxynaphthalene, 4,4'-biphenol, bis(4-hydroxyphenyl) ether, and bis(2-hydroxyphenyl) ether. They may be used either individually or as a combination of two or more monomeric constituents M2a. Particular examples of such dihydric aromatic alcohols are 4,4'-bisphenol and 2,2'-bisphenol.

Compounds M1b and M2b are the mono- or poly-sulfonated equivalents of the above-described non-sulfonated monomeric constituents M1a and M1b. Such sulfonated monomeric constituents are either well-known in the art or easily accessible via routine methods of organic synthesis. For example sulfonated aromatic dihalides, such as sodium 5,5'-sulphonyl bis(2-chlorobenzenesulfonate) (the 5,5'-bis sulfonated analog of DCDPS) are, for example, disclosed by [21] M. Ueda et al., J. Polym. Sci., Part A: Polym. Chem. Vol. 31 853 (1993).

The dialkali metal salt of said dihydric aromatic phenol is obtainable by the reaction between the dihydric aromatic alcohol and an alkali metal compound, such as potassium carbonate, potassium hydroxide, sodium carbonate or sodium hydroxide.

The reaction between the dihydric aromatic alcohol dialkali metal salt(s) and the aromatic dihalide(s) and a sulfonated monomer as defined above is carried out as described in the art (see for example [22] Harrison et al, Polymer preprints (2000) 41 (2) 1239). For example, in a polar solvent such as dimethyl sulfoxide, sulfolane, N-methyl-2-pyrrolidone, 1,3-dimethyl-2-imidazolidinone, N,N-dimethylformamide, N,N-dimethylacetamide, and diphenyl sulfone, or mixtures thereof or mixtures of such polar solvents with apolar organic solvents like toluene may be applied.

The reaction temperature is typically in the range of 140 to 320 or in particular 160 to 250° C. The reaction time may be in the range of 0.5 to 100, or in particular 2 to 15 h.

The use of either one of the dihydric aromatic alcohol alkali metal salt and the aromatic dihalide in excess results in the formation of end groups that can be utilized for molecular weight control. Otherwise, if the two constituents are used in equimolar amounts, and either one of a monohydric phenol, as for example, phenol, cresol, 4-phenylphenol or 3-phenylphenol, and an aromatic halide, as for example 4-chlorophenyl sulfone, 1-chloro-4-nitrobenzene, 1-chloro-2-nitrobenzene, 1-chloro-3-nitrobenzene, 4-fluorobenzophenone, 1-fluoro-4-nitrobenzene, 1-fluoro-2-nitrobenzene or 1-fluoro-3-nitrobenzene is added for chain termination.

The degree of polymerization (calculated on the basis of repeating units composed of one monomer (M1) and one monomer (M2), as for example repeating units (1) and (2) or (1a) and (2a)) of the thus obtained polymer may be in the range of 40 to 120, in particular 50 to 80 or 55 to 75.

Reaction of the monomeric constituents, in particular, of the aromatic dihalides M1a and M1b and the dihydric aromatic alcohol alkali metal salts of M2a and optionally M2b may also be performed as described [14] Geise, G. M., et al J. Poly. Sci, Part B: Polym Phys.: Vol 48, (2010), 1685 and literature cross-referenced therein.

1.2 Preparation of Substrate Layer (S)

Preparation of the sponge-like, macrovoid free substrate layer (S) is performed by applying well-known techniques of membrane formation, as for example described in [15] C. A. Smolders et al J. Membr. Sci.: Vol 73, (1992), 259.

A particular method of preparation is known as phase sinversion method.

In a first step the partially sulfonated polymer (P1) as prepared above is dried, as for example at a temperature in the range of 20 to 80, as for example 60° C. under vacuum in order to remove excess liquid.

In a second step a homogeneous dope solution comprising the polymer in a suitable solvent system is prepared. Said solvent system contains at least one solvent selected from N-methylpyrrolidone (NMP), N-dimethylacetamide (DMAc), dimethylsulfoxide (DMSO), dimethylformamide (DMF), triethylphosphate, tetrahydrofuran (THF), 1,4-dioxane, methyl ethyl ketone (MEK), or a combination thereof; and, additionally may contain at least one further additive selected from ethylene glycol, diethylene glycol, polyethylene glycol, glycerol, methanol, ethanol, isopropanol, polyvinylpyrrolidone, or a combination thereof, wherein said additive is contained in said polymer solution in a range of 0-50 or 0-30 wt.-% per total weight of the polymer solution.

The polymer content is in the range of 10 to 40, or 16 to 24 wt.-% based on the total weight of the solution. For example a typical composition comprises sPPSU 2.5%/ethylene glycol/N-methylpyrrolidone (NMP>99.5%) in a wt %-ratio of 20:16:64.

In a third step, the polymer solution is then cast on a solid support, as for example glass plate using a casting knife suitably of applying a polymer layer of sufficient thickness.

Immediately afterwards, in a fourth step, the polymer layer provided on said support is immersed in a coagulant bath, containing a water-based coagulation liquid, e.g. a tap water coagulant bath at room temperature. Optionally, water may be applied in admixture with at least one lower alcohol as coagulant bath, in particular methanol, ethanol, isopropanol, and optionally in admixture with at least one solvent as defined above. The as-cast membranes were soaked in water for at least 2 days with constant change of water to ensure complete removal of solvent in order to induce phase inversion.

As a result of this procedure a membrane substrate exhibiting a sponge-like structure with no macrovoids is obtained.

EXPERIMENTAL PART

Example 1

Preparation of Membrane Substrate Polymers a) sPPSU 2.5%

In a 4 l HWS-vessel with stirrer, Dean-Stark-trap, nitrogen-inlet and temperature control, 1.99 mol Dichlorodiphenylsulfone (DCDPS), 2.00 mol 4,4'-Dihydroxybiphenyl (DHBP), 0.05 mol 3,3'-Di-sodiumdisulfate-4,4'-dichlorodiphenylsulfone and 2.12 mol Potassiumcarbonate (Particle size 36.2 μm) are suspended under nitrogen atmosphere in 2000 ml NMP. Under stirring the mixture is heated up to 190° C. 30 l/h nitrogen is purged through the mixture and the mixture is kept at 190° C. for 6 h. After that time 1000 ml NMP are added to cool down the mixture. Under nitrogen the mixture is allowed to cool down below 60° C. After filtration the mixture is precipitated in water which contains 100 ml 2 m HCl. The precipitated product is extracted with hot water (20 h at 85° C.) and dried at 120° C. for 24 h under reduced pressure.

Viscosity number: 88.7 ml/g (1 wt.-/vol % solution in N-methylpyrrolidone at 25° C.).

The content of the sDCDPS monomer was estimated taking the S-content of the polymer to be 2.4 mol-%.

b) sPPSU 5%

In a 4 l HWS-vessel with stirrer, Dean-Stark-trap, nitrogen-inlet and temperature control, 1.90 mol Dichlorodiphenylsulfone (DCDPS), 2.00 mol 4,4'-Dihydroxybiphenyl (DHBP), 0.1 mol 3,3'-Di-sodiumdisulfate-4,4'-dichlorodiphenylsulfone (sDCDPS) and 2.12 mol Potassiumcarbonate (Particle size 36.2 µm) are suspended under nitrogen atmosphere in 2000 ml NMP. Under stirring the mixture is heated up to 190° C. 30 l/h nitrogen is purged through the mixture and the mixture is kept at 190° C. for 6 h. After that time 1000 ml NMP are added to cool down the mixture. Under nitrogen the mixture is allowed to cool down below 60° C. After filtration the mixture is precipitated in water which contains 100 ml 2 m HCl. The precipitated product is extracted with hot water (20 h at 85° C.) and dried at 120° C. for 24 h under reduced pressure.

Viscosity number: 83.2 ml/g (1 wt.-/vol % solution in N-methylpyrrolidone at 25° C.).

The content of the sDCDPS monomer was estimated taking the S-content of the polymer to be 4.7 mol-%.

Example 2

Fabrication of Fully Sponge-Like and Hydrophilic UF Membranes from sPPSU 2.5% and sPPSU 5% sPPSU 2.5% and sPPSU 5% were synthesized as described above in example 1 and following to the synthesis route developed by McGrath et al. [14].

N-methyl-2-pyrrolidone (NMP) from Merck and ethylene glycol (EG) from Sigma Aldrich were employed as the solvent and additive, respectively, in the fabrication of UF membranes. The composition of each dope solution was polymer/EG/NMP (wt %)=13/16/71.

The casting solutions were allowed to degas overnight prior to casting onto a glass plate with a casting knife of 100 µm in thickness. The as-cast membranes were then immersed into a water coagulation bath immediately at room temperature and kept for 1 day to ensure complete precipitation.

During the precipitation process, it can be observed that UF membranes cast from sPPSU materials with 2.5 and 5 mol % DCDPS show slower precipitation rates as compared to that of non-sulfonated PPSU materials. This is a common phenomenon since the sulfonated materials tend to facilitate delayed demixing as compared to that of non-sulfonated ones. However, compared to the known sulfonated materials synthesized via post-sulfonation method which requires blending with other polymer to form asymmetric membranes [16], the directly sulfonated polymers of the present invention can form free standing asymmetric membranes without blending with other polymer.

FIG. 1 shows the SEM images of UF membranes cast with non-sulfonated and sulfonated materials. As expected, the membrane from non-sulfonated PPSU (FIG. 1a) exhibits numerous macrovoids due to instantaneous demixing, while those from sulfonated PPSU of the present invention (FIGS. 1b and 1c) display a fully sponge-like and interconnected pore structures with no observed macrovoids.

It also can be observed that the bottom surfaces of membranes from sulfonated materials are fully porous. The typical membrane morphology as shown in FIGS. 1b and 1c is highly favourable for UF applications and can be potentially applied as membrane substrates for other type of membrane processes such as NF or forward osmosis (FO). In addition, they also exhibit more hydrophilic properties and higher porosity as compared to that of non-sulfonated one. Table 1 shows the contact angles of top and bottom surfaces as well as porosity of UF membranes from both non-sulfonated and sulfonated PPSU.

TABLE 1

Contact angles of top and bottom surfaces as well as porosity of UF membranes from non-sulfonated and sulfonated PPSU

| Membrane ID | Contact angle (Top surface) | Contact angle (Bottom surface) | Porosity (%) |
|---|---|---|---|
| PPSU (non-sulfonated) | 86.2 ± 1.05 | 90.9 ± 1.43 | 65.0% |
| sPPSU (2.5 mol % sDCDPS) | 76.5 ± 1.82 | 68.3 ± 1.19 | 83.4% |
| sPPSU (5 mol % sDCDPS) | 62.1 ± 1.71 | 55.3 ± 1.09 | 84.18% |

Example 3

UF Performance Testing of sPPSU-2.5% sPPSU-5% and PPSU Membranes

The above-mentioned fabricated flat sheet membrane substrate was first tested to measure its pure water permeability (PWP) (in L/m$^2$·bar·hr) by an ultrafiltration membrane permeation cell with a sample diameter of 5 cm [17, 18].

$$PWP = \frac{Q}{A \cdot \Delta P} \quad (1)$$

where Q is the water permeation volumetric flow rate (L/h), A is the effective filtration area (m$^2$), and ΔP is the trans-membrane pressure (bar).

Subsequently, the membrane was subjected to neutral solute (polyethylene glycol (PEG) or polyethylene oxide (PEO)) separation tests by flowing them through the membrane's top surface under a pressure of 25 psi (1.72 bar) on the liquid side. The concentrations of the neutral solutes were measured by a total organic carbon analyzer (TOC ASI-5000A, Shimadzu, Japan). The measured feed ($C_f$) and permeate ($C_p$) concentrations were used for the calculation of the effective solute rejection coefficient R (%):

$$R = \left(1 - \frac{C_p}{C_f}\right) \times 100\% \quad (2)$$

In this work, solutions containing 200 ppm of different molecular weights of PEG or PEO were used as the neutral solutes for the characterizations of membrane pore size and pore size distribution. The relationship between Stokes radius ($r_s$, nm) and molecular weight ($M_w$, gmol$^{-1}$) of these neutral solutes can be expressed as:

For PEG $r = 16.73 \times 10^{-12} \times M^{0.557}$ (3)

For PEO $r = 10.44 \times 10^{-12} \times M^{0.587}$ (4)

From Eq. (3) and (4), the radius (r) of a hypothetical solute at a given $M_w$ can be calculated. The mean effective pore size and the pore size distribution were then obtained according to the traditional solute transport approach by ignoring influences of the steric and hydrodynamic interaction between solute and membrane pores, the mean effective pore radius ($\mu_p$) and the geometric standard deviation ($\sigma_p$) can be assumed to be the same as $\mu_s$ (the geometric mean radius of solute at R=50%) and $\sigma_g$ (the geometric standard deviation defined as the ratio of the $r_s$ at R=84.13% over that at R=50%). Therefore, based on $\mu_p$ and $\sigma_p$, the pore size distribution of a membrane can be expressed as the following probability density function:

$$\frac{dR(d_p)}{dd_p} = \frac{1}{d_p \ln\sigma_p \sqrt{2\pi}} \exp\left[-\frac{(\ln d_p - \ln\mu_p)^2}{2(\ln\sigma_p)^2}\right] \quad (5)$$

TABLE 2

Summary of PWP and pore size characteristics of UF membranes from non-sulfonated and direct sulfonated PPSU materials

| Membrane ID | PPSU (non-sulfonated) | sPPSU (2.5 mol % sDCDPS) | sPPSU (5 mol % sDCDPS) |
|---|---|---|---|
| $\mu_p$ (nm) | 8.38 | 10.72 | 8.29 |
| $\sigma_p$ | 2.37 | 1.99 | 2.27 |
| PWP L/(m² · bar · hr) | 6,529 | 846.4 | 241.3 |
| MWCO (Da) | 194,674 | 195,423 | 169,913 |

Table 2 represent the PWP and pore size characteristics of UF membranes from non-sulfonated and direct sulfonated PPSU materials. It is interesting to take note that the PWP of these membranes follows the order: non-sulfonated PPSU>sPPSU (2.5 mol % DCDPS)>sPPSU (5 mol % DCDPS). Although the non-sulfonated PPSU membranes are highly hydrophobic, it possesses large number of macrovoids with higher fouling tendency. Hence, this may be the reason why it has the highest PWP among all membrane substrates. Meanwhile, the membrane substrate from 5 mol % DCDPS polymer results in a lower PWP than that containing 2.5 mol % sulphonated monomer. This phenomenon is due to the fact that the former has a higher degree of water-induced swelling than the latter.

The MWCO of as-cast membranes is in the following order: sPPSU (2.5 mol % DCDPS)>non-sulfonated PPSU>sPPSU (5 mol % DCDPS). The MWCO in the sPPSU with 2.5 mol % is higher than non-sulfonated PPSU because its sulfonic group induces delayed demixing and results in larger pore size. However, the MWCO in the sPPSU with 5 mol % is smaller than other membranes due to the effect of larger swelling behavior in the highly sulfonated materials. These results show that the membranes from direct sulfonation materials with some degrees of sulfonation have a high potential to be developed for UF membranes since it posseses good PWP and anti fouling property with high porosity and interconnected pore structures.

Example 4

Mechanical Strength Properties of PPSU, sPPSU 2.5% and sPPSU 5% Membranes

Table 3 summarizes mechanical strengths of the fabricated UF membranes. Young's modulus decreases, while elongation at break increases with an increase in sulfonation degree of membrane substrates. For sulfonated PPSU with 5 mol % sDCDPS, it shows lower mechanical strength. The fabricated UF membranes were immersed in the glycerol/water 50/50 wt % mixture for 2 days followed by drying in the air before carrying out the mechanical test. The mechanical properties of membrane substrates were then measured by an Instron 5542 tensile testing equipment. The flat sheet membranes were cut into stripes with 5 mm width and clamped at the both ends with an initial gauge length of 25 mm and a testing rate of 10 mm/min. At least three stripes were tested for each casting condition to obtain the average values of tensile stress, extension at break and Young's modulus of the membranes.

TABLE 3

Mechanical properties of UF membranes from non-sulfonated and sulfonated materials

| Membrane ID | Young's modulus (MPa) | Tensile strength (MPa) | Elongation at break (%) |
|---|---|---|---|
| PPSU (non-sulfonated) | 241.0 ± 16.2 | 7.89 ± 0.29 | 18.4 ± 3.77 |
| sPPSU (2.5 mol % DCDPS) | 75.7 ± 2.72 | 3.67 ± 0.10 | 37.2 ± 4.45 |
| sPPSU (5 mol % DCDPS) | 14.2 ± 0.77 | 0.97 ± 0.05 | 43.9 ± 2.34 |

List of References

[1] L. Jian-yu, D. Xi, G. Lipscomb, Cleaning membranes with focused ultrasound beams for drinking water treatment, in: Ultrasonics Symposium (IUS), 2009 IEEE International, 2009, pp. 1195-1198.

[2] A. P. Echavarría, V. Falguera, C. Torras, C. Berdún, J. Pagán, A. Ibarz, Ultrafiltration and reverse osmosis for clarification and concentration of fruit juices at pilot plant scale, LWT—Food Science and Technology, 46 (2012) 189-195.

[3] E. Zárate-Rodríguez, E. Ortega-Rivas, G. V. Barbosa-Cánovas, Effect of membrane pore size on quality of ultrafiltered apple juice, International Journal of Food Science & Technology, 36 (2001) 663-667.

[4] Q. Yang, T.-S. Chung, Y. E. Santoso, Tailoring pore size and pore size distribution of kidney dialysis hollow fiber membranes via dual-bath coagulation approach, Journal of Membrane Science, 290 (2007) 153-163.

[5] M. Ulbricht, G. Belfort, Surface modification of ultrafiltration membranes by low temperature plasma II. Graft polymerization onto polyacrylonitrile and polysulfone, Journal of Membrane Science, 111 (1996) 193-215.

[6] N. Pezeshk, D. Rana, R. M. Narbaitz, T. Matsuura, Novel modified PVDF ultrafiltration flat-sheet membranes, Journal of Membrane Science, 389 (2012) 280-286.

[7] A. Kumari, G. Sarkhel, A. Choudhury, Preparation and characterization of polyvinylpyrollidone incorporated cellulose acetate membranes for ultrafiltration of metal ion, Journal of Applied Polymer Science, (2012).

[8] M. N. Sarbolouki, Properties of asymmetric polyimide ultrafiltration membranes. I. Pore size and morphology characterization, Journal of Applied Polymer Science, 29 (1984) 743-753.

[9] H. A. Vogel, Polyarylsulfones, synthesis and properties, Journal of Polymer Science Part A-1: Polymer Chemistry, 8 (1970) 2035-2047.

[10] Y. Ma, F. Shi, J. Ma, M. Wu, J. Zhang, C. Gao, Effect of PEG additive on the morphology and performance of polysulfone ultrafiltration membranes, Desalination, 272 (2011) 51-58.

[11] G. Arthanareeswaran, D. Mohan, M. Raajenthiren, Preparation, characterization and performance studies of ultrafiltration membranes with polymeric additive, Journal of Membrane Science, 350 (2010) 130-138.

[12] O. Rami Messalem, B. S. Kedem, R. Linder, Apparatus and system for deionization, US 2010/0326833 A1 (2010).

[13] J. Kerres, W. Cui, Acid-base polymer blends and their use in membrane processes, CA2325020 (1999).
[14] G. M. Geise, H. S. Lee, D. J. Miller, B. D. Freeman, J. E. McGrath, D. R. Paul, Water purification by membrane: The role of polymer science, J. Polym. Sci. Part B: Polym. Phys. 48 (2010) 1685.
[15] C. A. Smolders, A. J. Reuvers, R. M. Boom, I. M. Wienk, Microstructures in phase inversion membranes. Part I. Formation of macrovoids, J. Membr. Sci. 73 (1992) 259.
[16] N. Widjojo, T. S. Chung, M. Weber, C. Maletzko, V. Warzelhan, The role of sulphonated polymer and macrovoid-free structure in the support layer for thin-film composite (TFC) forward osmosis (FO) membranes, J. Membr. Sci. 383 (2011) 214.
[17] S. Singh, K. Khulbe, T. Matsuura, P. Ramamurthy, Membrane characterization by solute transport and atomic force microscopy. J. Membr. Sci. 142 (1998) 111.
[18] K. Y. Wang, T. Matsuura, T. S. Chung, W. F. Guo, The effects of flow angle and shear rate within the spinneret on the separation performance of poly(ethersulfone) (PES) ultrafiltration hollow fiber membranes. J. Membr. Sci. 240 (2004) 67.
[19] M C Porter et al. in Handbook of Industrial Membrane Technology (William Andrew Publishing/Noyes, 1990).
[20] R. N. Johnson et al., J. Polym. Sci. (1967)A-1, Vol. 5, 2375.
[21] M. Ueda et al., J. Polym. Sci., Part A: Polym. Chem. (1993) Vol. 31 853.
[22] Harrison et al, Polymer preprints (2000) 41 (2) 1239.

The disclosure of herein cited documents is incorporated by reference

The invention claimed is:

1. An ultrafiltration membrane consisting of at least one membrane substrate layer (S) that represents a sponge-like and macrovoid-free structure and comprises as the single membrane forming polymeric material at least one partially sulfonated polyethersulfone polymer (P1), wherein said polymer (P1) comprises non-sulfonated and sulfonated repeating units and wherein in said partially sulfonated polyethersulfone polymer (P1) about 0.5 to 4.5 mole-% of the monomeric constituents or repeating units of the polymer carry at least one sulfonate group, wherein said partially sulfonated polyethersulfone polymer (P1) is a polyaryleneethersulfone polymer and its repeating units are composed of monomeric units of the general formulae

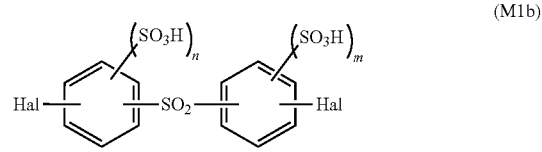

(M1)

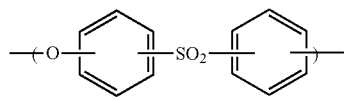

(M2)

wherein
Ar represents a divalent arylene residue,
at least one monomeric unit selected from 1 and M2 is sulphonated
and the aromatic rings as contained in M1 and M2 optionally and independently of each other is optionally further substituted;
and wherein said partially sulfonated polyethersulfone polymer (P1) is obtained by polymerizing monomers of the general formulae M1a and M2a

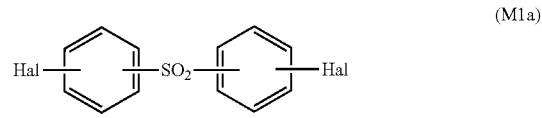

(M1a)

HO—Ar—OH (M2a)

wherein Ar represents a divalent arylene residue, and
Hal is F, Cl, Br or I
and at least one sulphonated monomer of the general foimulae M1b and M2b

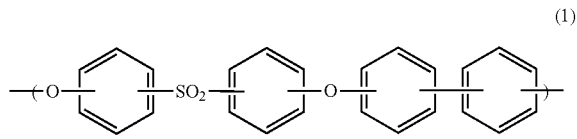

(M1b)

(M2b)

wherein Hal and Ar are as defined above, and n and m independently are 0, 1 or 2, provided that n and m are not simultaneously 0, wherein the substrate layer (s) has a layer thickness in the range of 30-400 μm.

2. The membrane of claim 1, wherein said partially sulfonated polyethersulfone polymer (P1) is a block copolymer or statistical copolymer.

3. The membrane of claim 1, wherein said partially sulfonated polyethersulfone polymer (P1) comprises
a non-sulfonated repeating unit of formula (1)

(1)

and a sulfonated repeating unit of formula (2)

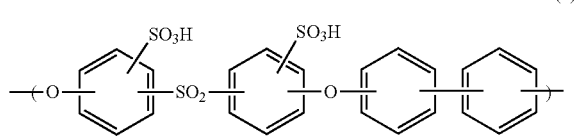

(2)

4. The membrane of claim 3, wherein said sulfonated repeating unit is contained in a molar ratio of 0.5 to 4.5 mole-% based on the total mole number of repeating units (1) and (2).

5. The membrane of claim 1, wherein said polymer P1 has a Mw in the range of 50,000 to 150,000 g/mol, as determined by Gel Permeation Chromatography (GPC) in N-dimethylacetamide (DMAc).

6. The membrane of claim 1, wherein said polymer P1 has a Mw in the range of 70,000 to 100,000 g/mol, as determined by Gel Permeation Chromatography (GPC) in N-dimethylacetamide (DMAc).

7. The membrane of claim 1, wherein the substrate layer (S) has a layer thickness in the range of 50-250 μm.

8. A method of preparing the membrane of claim 1, which method comprises preparing at least one substrate layer (S) by applying a polymer solution comprising at least one partially sulphonated polyethersulfone polymer (P1) as defined in claim 1.

9. The method of claim 8, wherein the polymer content of said solution is in the range of 10 to 24 wt.-%.

10. The method of claim 9, wherein the polymer solution contains at least one solvent and said solvent is N-methylpyrrolidone (NMP), N-dimethylacetamide (DMAc), dimethylsulfoxide (DMSO), dimethylformamide (DMF), triethylphosphate, tetrahydrofuran (THF), 1,4-dioxane, methyl ethyl ketone (MEK), or a combination thereof; and, additionally may contain at least one further additive selected from ethylene glycol, diethylene glycol, polyethylene glycol, glycerol, methanol, ethanol, isopropanol, polyvinylpyrrolidone, or a combination thereof, wherein said additive is contained in said polymer solution in a range of 0-30 wt.-% per total weight of the polymer solution.

11. An ultrafiltration membrane comprising at least one membrane prepared according to claim 8.

12. An ultrafiltration method which comprises utilizing the membrane of claim 1.

13. A substrate for fabricating membranes adapted to other applications which comprises the membrane of claim 1.

14. The membrane of claim 4, wherein said sulfonated repeating unit is contained in a molar ratio of 1 to 3.5 mole-% based on the total mole number of repeating units (1) and (2).

* * * * *